(12) United States Patent
Suzuki

(10) Patent No.: US 11,419,166 B2
(45) Date of Patent: Aug. 16, 2022

(54) TERMINAL DEVICE, COMMUNICATION SETTING METHOD PERFORMED BY TERMINAL DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventor: Atsushi Suzuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/201,658

(22) Filed: Mar. 15, 2021

(65) Prior Publication Data

US 2021/0298099 A1 Sep. 23, 2021

(30) Foreign Application Priority Data

Mar. 18, 2020 (JP) .............................. JP2020-047709

(51) Int. Cl.
| | | |
|---|---|---|
| *H04W 88/06* | (2009.01) | |
| *H04W 76/11* | (2018.01) | |
| *H04W 76/14* | (2018.01) | |
| *H04W 76/15* | (2018.01) | |
| *H04W 12/06* | (2021.01) | |
| *H04W 40/24* | (2009.01) | |
| *H04W 4/80* | (2018.01) | |

(52) U.S. Cl.
CPC ............ *H04W 76/11* (2018.02); *H04W 12/06* (2013.01); *H04W 40/24* (2013.01); *H04W 76/14* (2018.02); *H04W 76/15* (2018.02); *H04W 88/06* (2013.01); *H04W 4/80* (2018.02)

(58) Field of Classification Search
CPC combination set(s) only.
See application file for complete search history.

(56) References Cited

U.S. PATENT DOCUMENTS

| | | | | |
|---|---|---|---|---|
| 7,325,235 B2* | 1/2008 | Iida | ....................... | G06F 3/1285 |
| | | | | 719/310 |
| 9,924,355 B2* | 3/2018 | Naruse | .................. | H04W 12/50 |
| 10,129,499 B1* | 11/2018 | Boone | ................. | H04W 12/047 |

(Continued)

FOREIGN PATENT DOCUMENTS

| | | |
|---|---|---|
| JP | 2005-142792 | 6/2005 |
| JP | 2019-171690 | 10/2019 |

*Primary Examiner* — Cindy Trandai
(74) *Attorney, Agent, or Firm* — Workman Nydegger

(57) ABSTRACT

A smart device that wirelessly communicates with a wireless router includes a terminal controller that executes an OS, and a multifunction device control app that operates on the OS; a terminal storage section having a first storage area that is controlled by the OS and stores connection information of the wireless router, and a second storage area that is accessible by the multifunction device control app; and a terminal communicator including a first terminal communicator that communicates with the wireless router by using a wireless LAN communication scheme, and a second terminal communicator that communicates with a multifunction device by using a BLE communication scheme. The terminal controller stores the connection information in the second storage area and transmits the stored connection information to the multifunction device by using the second terminal communicator.

15 Claims, 5 Drawing Sheets

(56) References Cited

U.S. PATENT DOCUMENTS

| | | | |
|---|---|---|---|
| 2003/0007641 A1* | 1/2003 | Kinoshita | H04L 63/04 380/270 |
| 2005/0227677 A1* | 10/2005 | Kallio | H04L 67/34 455/414.3 |
| 2007/0086394 A1 | 4/2007 | Yamada et al. | |
| 2010/0071034 A1* | 3/2010 | Furuichi | G06F 21/608 358/1.15 |
| 2010/0304670 A1* | 12/2010 | Shuo | H04W 12/33 455/41.1 |
| 2011/0099249 A1* | 4/2011 | Cho | H04L 67/06 709/219 |
| 2013/0331063 A1* | 12/2013 | Cormier | H04L 63/0853 455/411 |
| 2017/0048696 A1* | 2/2017 | Kurihara | H04W 48/20 |
| 2017/0286028 A1* | 10/2017 | Yang | G06F 3/1285 |
| 2018/0054536 A1* | 2/2018 | Kadota | H04W 52/18 |
| 2018/0124847 A1* | 5/2018 | Nishida | H04W 8/005 |
| 2019/0104464 A1* | 4/2019 | Ruan | H04W 40/246 |
| 2020/0045763 A1* | 2/2020 | Watanabe | G06F 3/1204 |
| 2020/0314925 A1* | 10/2020 | Fujii | H04W 8/005 |

\* cited by examiner

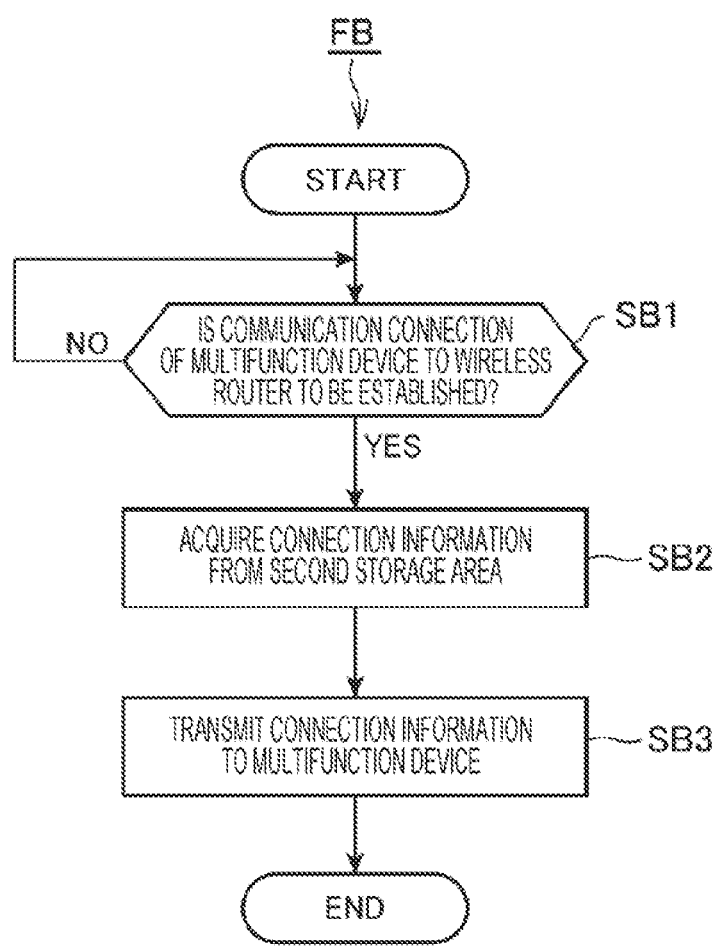

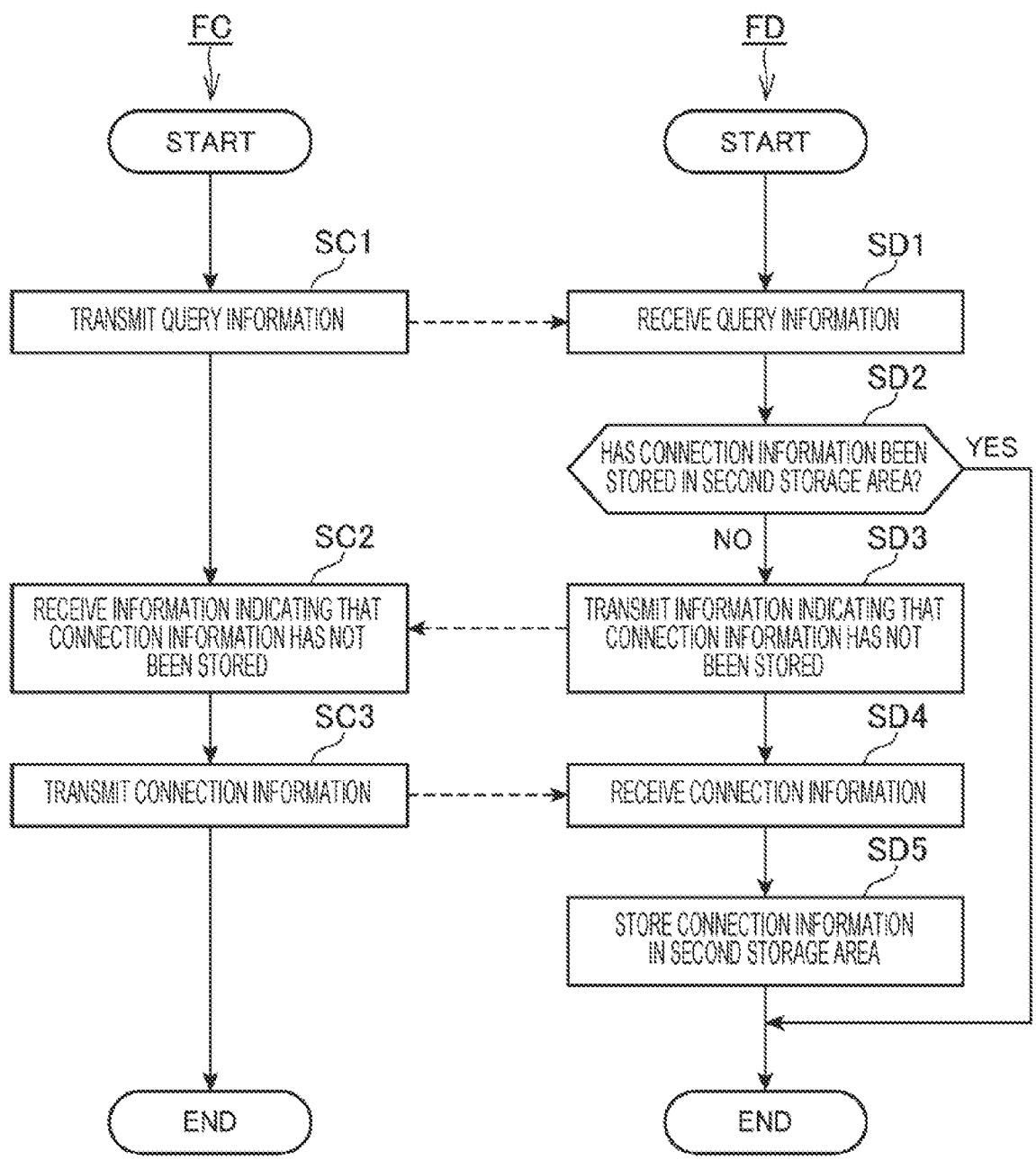

TERMINAL DEVICE, COMMUNICATION SETTING METHOD PERFORMED BY TERMINAL DEVICE, AND NON-TRANSITORY COMPUTER-READABLE STORAGE MEDIUM STORING PROGRAM The present application is based on, and claims priority from JP Application Serial Number 2020-047709, filed Mar. 18, 2020, the disclosure of which is hereby incorporated by reference herein in its entirety.

BACKGROUND

1. Technical Field

The present disclosure relates to a terminal device, a communication setting method performed by the terminal device, and a non-transitory computer-readable storage medium storing a program.

2. Related Art

In the related art, there is a terminal device that establishes a communication connection of another device to a wireless router. For example, JP-A-2005-142792 discloses a technique in which, when establishing a communication connection of an Internet radio to a wireless local area network (LAN) access point router, a personal computer (PC) establishes, by using a function of an application program, a communication connection to the Internet radio and transmits, to the Internet radio, information on connection to the wireless LAN access point router.

A technique of communication connection using an application program, such as the technique disclosed in JP-A-2005-142792, is also performed when a communication connection of a printing device to a wireless router is established. However, depending on the type of operating system of terminal device, the application program is not able to acquire, from the operating system, connection information of the wireless router to which the terminal device is connected, and thus it is not easy to transmit the connection information.

SUMMARY

A terminal device according to an aspect that solves the above-described issue is a terminal device configured to connect to a wireless router by using a first wireless communication scheme and wirelessly communicate a printing device configured to connect to the wireless router. The terminal device includes a controller configured to execute an operating system, and an application program that is related to the printing device and operates on the operating system; a storage having a first storage area that is controlled by the operating system and stores connection information of the wireless router, and a second storage area that is accessed by the application program; and a communicator including a first communicator configured to communicate with the wireless router by using the first wireless communication scheme, and a second communicator configured to communicate with the printing device by using a second wireless communication scheme. The controller stores the connection information in the second storage area and transmits the connection information stored in the second storage area to the printing device by using the second communicator.

A communication setting method performed by a terminal device according to another aspect that solves the above-described issue is a communication setting method performed by a terminal device configured to connect to a wireless router by using a first wireless communication scheme and wirelessly communicate with a printing device configured to connect to the wireless router. The communication setting method includes connecting to the wireless router by using connection information of the wireless router stored in a first storage area that is controlled by an operating system and stores the connection information; storing the connection information in a second storage area different from the first storage area and accessed by an application program that is related to the printing device and operates on the operating system; and transmitting, through operation of the application program, the connection information stored in the second storage area to the printing device by using a second wireless communication scheme different from the first wireless communication scheme.

A non-transitory computer-readable storage medium according to still another aspect that solves the above-described issue is a non-transitory computer-readable storage medium storing a program that is related to a printing device and is executed by a controller of a terminal device configured to wirelessly communicate with a wireless router by using a first wireless communication scheme and wirelessly communicate with the printing device configured to connect to the wireless router. The program causes the controller to execute a process including storing connection information of the wireless router in a second storage area different from a first storage area that is controlled by an operating system and stores the connection information; and transmitting the connection information stored in the second storage area to the printing device by using a second wireless communication scheme different from the first wireless communication scheme.

BRIEF DESCRIPTION OF THE DRAWINGS

FIG. 4 is a flowchart illustrating the operation of the smart device.

FIG. 5 includes flowcharts illustrating operations performed in the wireless communication system.

DESCRIPTION OF EXEMPLARY EMBODIMENTS

Figure 1:
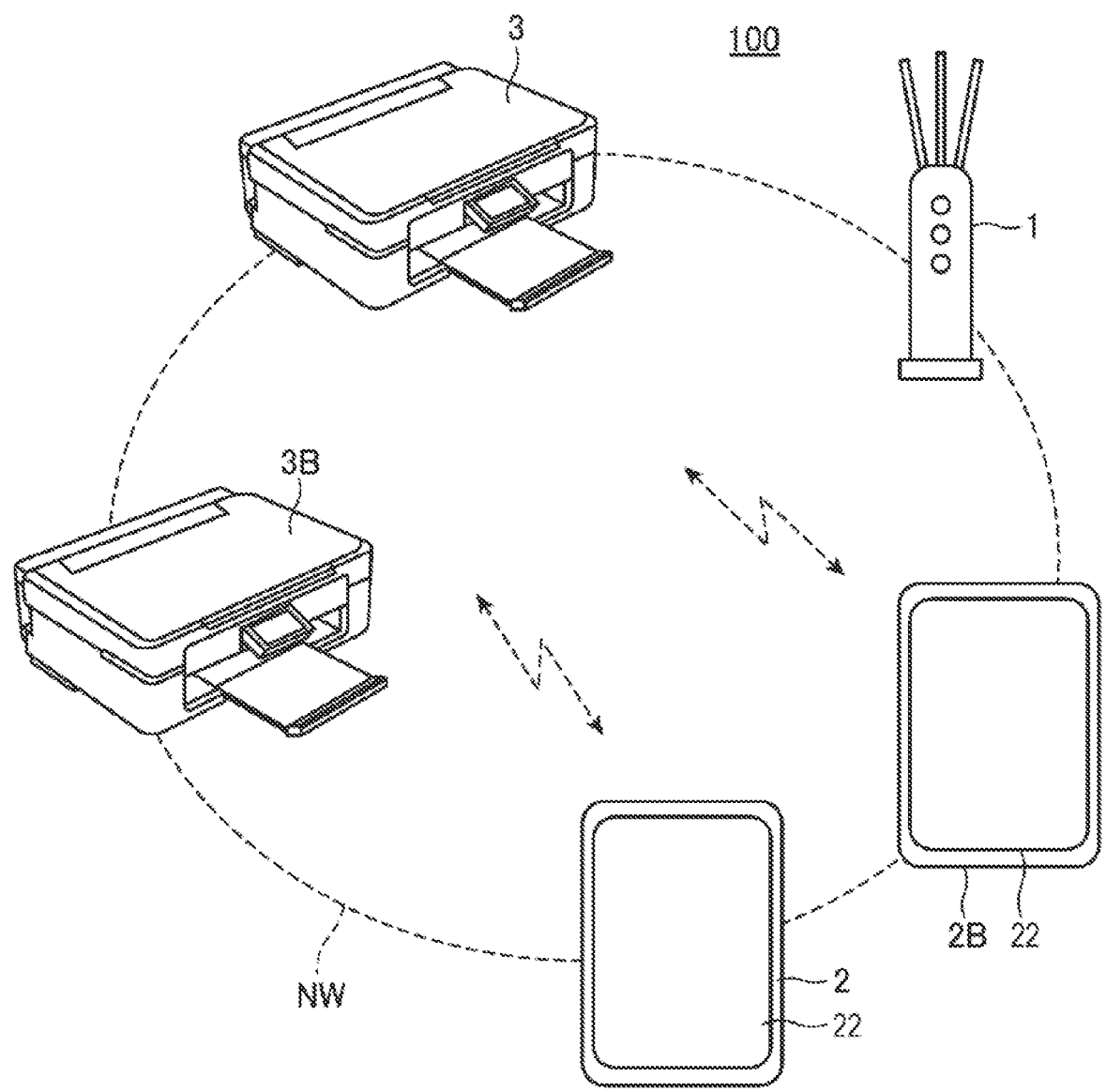
FIG. 1 illustrates a configuration of a wireless communication system.

FIG. 1 illustrates a configuration of a wireless communication system 100. As illustrated in FIG. 1, the wireless communication system 100 includes a wireless router 1, smart devices 2 and 2B, and multifunction devices 3 and 3B. Each of the smart devices 2 and 2B corresponds to an example of a terminal device. Each of the multifunction devices 3 and 3B corresponds to an example of a printing device.

The wireless router 1 is a device having an access point function. The wireless router 1 constructs a wireless network NW and relays data communications between devices that connect to the wireless network NW. The wireless router 1 connects to a global network and relays data communications between a device that connects to the global network and a device that connects to the wireless network NW.

The smart device 2 is a user-portable terminal device, for example, a smartphone, a tablet-type terminal, or the like.

The multifunction device 3 is called a multifunction peripheral (MFP), and is a device having various functions, such as printing and reading. The multifunction device 3 executes a process corresponding to each function in accordance with control data received from the smart device 2. The multifunction device 3 executes various processes in accordance with user's operations of an input unit, such as an operation switch or touch panel, provided in the multifunction device 3.

In the wireless communication system 100, the smart device 2 and the multifunction device 3 can communicate with each other by using a communication scheme complying with Bluetooth low energy (BLE) standards and a communication scheme complying with wireless local area network (LAN) standards. Bluetooth is a registered trademark. Wi-Fi is a registered trademark. In the following description, a communication scheme complying with the BLE standards is referred to as "BLE communication scheme", and a communication scheme complying with the wireless LAN standards is referred to as "wireless LAN communication scheme". The BLE communication scheme corresponds to an example of a second wireless communication scheme, and the wireless LAN communication scheme corresponds to an example of a first wireless communication scheme.

When the smart device 2 and the multifunction device 3 communicate with each other by using the BLE communication scheme within the wireless communication system 100, the smart device 2 and the multifunction device 3 communicate with each other without involving the wireless router 1. Alternatively, when the smart device 2 and the multifunction device 3 communicate with each other by using the wireless LAN communication scheme within the wireless communication system 100, the smart device 2 and the multifunction device 3 connect to the wireless network NW constructed by the wireless router 1 and communicate with each other via the wireless router 1.

Figure 2:
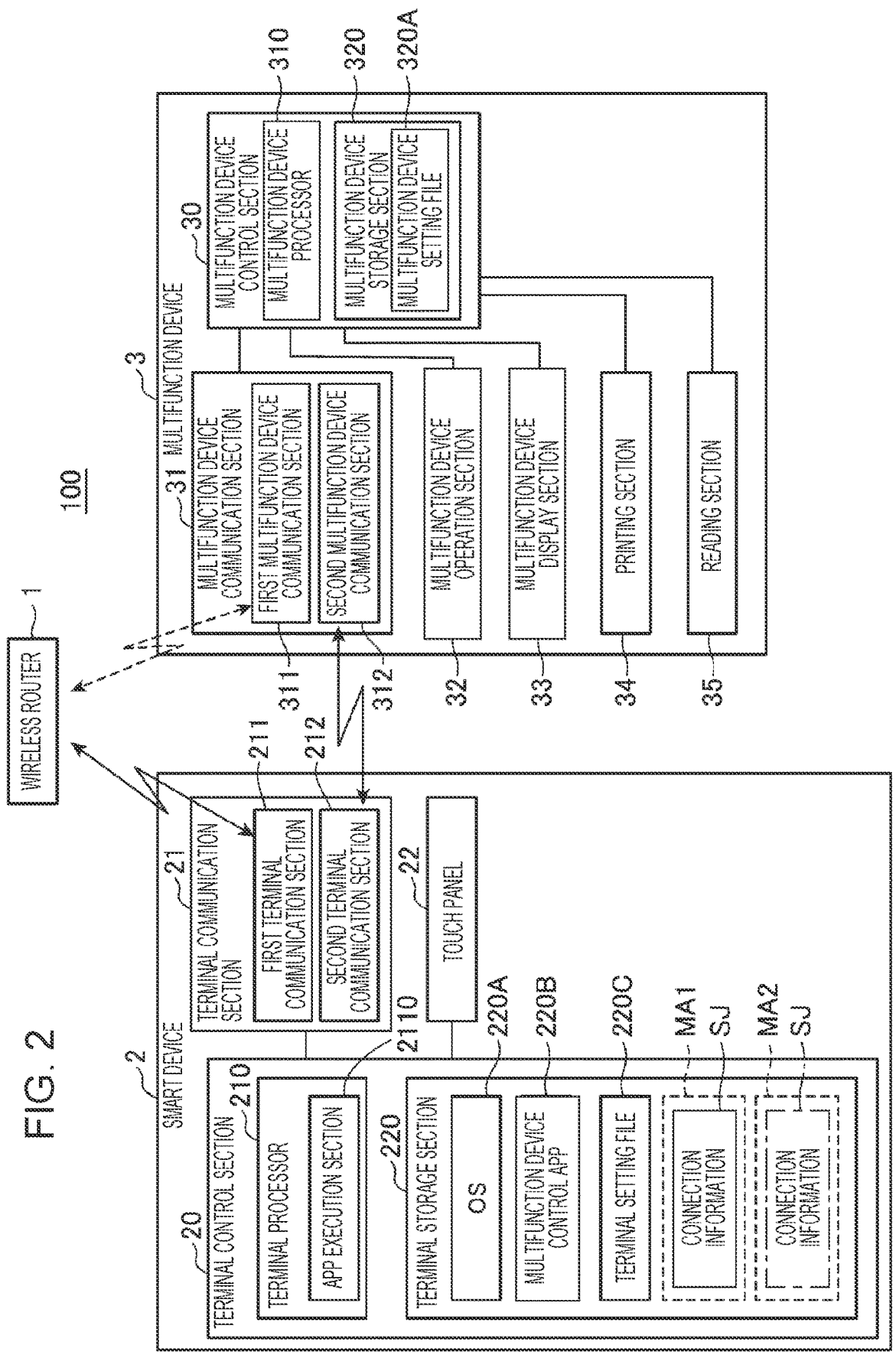
FIG. 2 illustrates functional configurations of a smart device and a multifunction device.

FIG. 2 illustrates functional configurations of the smart device 2 and the multifunction device 3. Configurations of the smart device 2B and the multifunction device 3B are the same as those of the smart device 2 and the multifunction device 3.

As illustrated in FIG. 2, the smart device 2 includes a terminal control section 20, a terminal communication section 21, and a touch panel 22. The terminal control section 20 corresponds to an example of a control section. The terminal communication section 21 corresponds to an example of a communication section.

The terminal control section 20 includes a terminal processor 210, which is a processor, such as a central processing unit (CPU) or microprocessor unit (MPU), that executes a program, and a terminal storage section 220. The terminal control section 20 controls each component of the smart device 2. The terminal storage section 220 corresponds to an example of a storage section. In the terminal control section 20, the terminal processor 210 reads out a program stored in the terminal storage section 220 and executes various processes by using hardware and software.

In the smart device 2, an application program is preinstalled that has various functions of controlling the multifunction device 3, such as a function of causing the multifunction device 3 to perform printing and a function of causing the multifunction device 3 to perform reading. In the following description, an application program is referred to as "multifunction device control app" and is denoted by a reference numeral "220B". The multifunction device control app 220B corresponds to an example of a program and an example of an application program that is related to a printing device. The multifunction device control app 220B operates on an operating system 220A serving as a basic control program. In the following description, an operating system is abbreviated as "OS". The multifunction device control app 220B is read out from the terminal storage section 220 and executed by the terminal processor 210 to cause the terminal control section 20 to function as an app execution section 2110.

The OS 220A is a general-purpose operating system. As this type of operating system, there are iOS, Android, Mac OS, and so forth. Each of iOS, Android, and Mac OS is a registered trademark.

The terminal storage section 220 has a storage area storing a program to be executed by the terminal processor 210 and data to be processed by the terminal processor 210. The terminal storage section 220 stores the OS 220A, the multifunction device control app 220B, a terminal setting file 220C, and other various data. The terminal setting file 220C stores a combination of a setting item related to the smart device 2 and a setting value corresponding to the setting item. The terminal storage section 220 has a non-volatile storage area storing a program and data in a non-volatile manner. The terminal storage section 220 may have a volatile storage area to form a work area temporarily storing a program to be executed and data to be processed by the terminal processor 210.

The terminal storage section 220 has a first storage area MA1 and a second storage area MA2. The first storage area MA1 is a storage area that is controlled by the OS 220A and is not able to be accessed by programs including the multifunction device control app 220B other than the OS 220A. The second storage area MA2 is a storage area that can be accessed by the multifunction device control app 220B. When the smart device 2 establishes a communication connection to the wireless router 1, through operation of the OS 220A, the terminal control section 20 stores, in the first storage area MA1, connection information SJ of the wireless router 1 set in the terminal setting file 220C. The connection information SJ includes a service set identifier (SSID) of the wireless network NW constructed by the wireless router 1, and a password for connecting to the wireless network NW.

The terminal communication section 21 includes a first terminal communication section 211 and a second terminal communication section 212. The first terminal communication section 211 corresponds to an example of a first communication section. The second terminal communication section 212 corresponds to an example of a second communication section. The first terminal communication section 211 is composed of communication hardware according to the wireless LAN standards and performs wireless communication by using the wireless LAN communication scheme under the control of the terminal control section 20. The second terminal communication section 212 is composed of communication hardware according to the BLE standards and performs wireless communication by using the BLE communication scheme under the control of the terminal control section 20.

The touch panel 22 includes a display panel, such as a liquid crystal display panel, and a touch sensor overlaid on or integrated into the display panel. The display panel displays various images under the control of the terminal control section 20. The touch sensor detects a touch operation and outputs the detection to the terminal control section 20. The terminal control section 20 executes a process corresponding to the touch operation performed on the touch panel 22 in accordance with an input from the touch sensor.

A functional block of the multifunction device 3 will be described. The multifunction device 3 includes a multifunction device control section 30, a multifunction device communication section 31, a multifunction device operation section 32, a multifunction device display section 33, a printing section 34, and a reading section 35.

The multifunction device control section 30 includes a multifunction device processor 310, which is a processor, such as a CPU or MPU, that executes a program, and a multifunction device storage section 320. The multifunction device control section 30 controls each component of the multifunction device 3. In the multifunction device control section 30, the multifunction device processor 310 reads out a program stored in the multifunction device storage section 320 and executes various processes by causing hardware to operate in cooperation with software.

The multifunction device storage section 320 has a storage area storing a program to be executed by the multifunction device processor 310 and data to be processed by the multifunction device processor 310. The multifunction device storage section 320 stores a program to be executed by the multifunction device processor 310, a multifunction device setting file 320A, and other various data. The multifunction device setting file 320A stores a combination of a setting item related to the multifunction device 3 and a setting value corresponding to the setting item. The multifunction device storage section 320 has a nonvolatile storage area storing a program and data in a nonvolatile manner. The multifunction device storage section 320 may have a volatile storage area to form a work area temporarily storing a program to be executed and data to be processed by the multifunction device processor 310.

The multifunction device communication section 31 includes a first multifunction device communication section 311 and a second multifunction device communication section 312. The first multifunction device communication section 311 is composed of communication hardware according to the wireless LAN standards and performs wireless communication by using the wireless LAN communication scheme under the control of the multifunction device control section 30. The second multifunction device communication section 312 is composed of communication hardware according to the BLE standards and performs wireless communication by using the BLE communication scheme under the control of the multifunction device control section 30.

The multifunction device operation section 32 includes an operation button provided in the multifunction device 3, detects a user's operation, and outputs a detection result to the multifunction device control section 30. The multifunction device operation section 32 may include a touch panel in addition to or in place of the operation button. The multifunction device control section 30 executes a process corresponding to the operation performed on the operation unit in accordance with an input from the multifunction device operation section 32.

The multifunction device display section 33 includes a plurality of light-emitting diodes (LEDs), a display panel, and so forth. In accordance with a control operation performed by the multifunction device control section 30, each LED turns on or off or flashes in a predetermined manner, and the display panel provides, for example, a display of information. When the multifunction device operation section 32 includes a touch panel, the multifunction device display section 33 may cause the touch panel to function as a display panel.

The printing section 34 includes components related to printing, such as an ink jet head that ejects ink onto a print medium to form dots, a carriage that causes the ink jet head to operate in a direction of scanning, a carriage drive motor that drives the carriage, a transport unit that transports a print medium, and an ink supply unit that supplies ink to the ink jet head. In accordance with a control operation performed by the multifunction device control section 30, the printing section 34 ejects ink from a nozzle of the ink jet head to form dots on a printing surface of a print medium being transported and thus performs printing on the print medium.

The reading section 35 includes a component related to reading, such as a scanner that reads letters and/or images recorded on a document. The reading section 35 reads the recorded letters and/or images by causing a light source to irradiate the document with light and outputs image data obtained through the reading to the multifunction device control section 30. The multifunction device control section 30 subjects the image data input from the reading section 35 to data processing, such as red-green-blue (RGB) conversion or compression processing, to generate data in a predetermined format. The multifunction device control section 30 causes the multifunction device storage section 320 to store the data generated in the predetermined format.

In the wireless communication system 100, when the smart device 2 controls the multifunction device 3 by using a function of the multifunction device control app 220B, the smart device 2 and the multifunction device 3 connect to the wireless network NW constructed by the wireless router 1 and communicate with each other via the wireless router 1. This is because, in the wireless LAN communication scheme, a communication rate and a range in which communication is possible are higher and wider than those in the BLE communication scheme. The smart device 2 performs the following operation to establish a communication connection of the multifunction device 3 to the wireless router 1.

Figure 3:
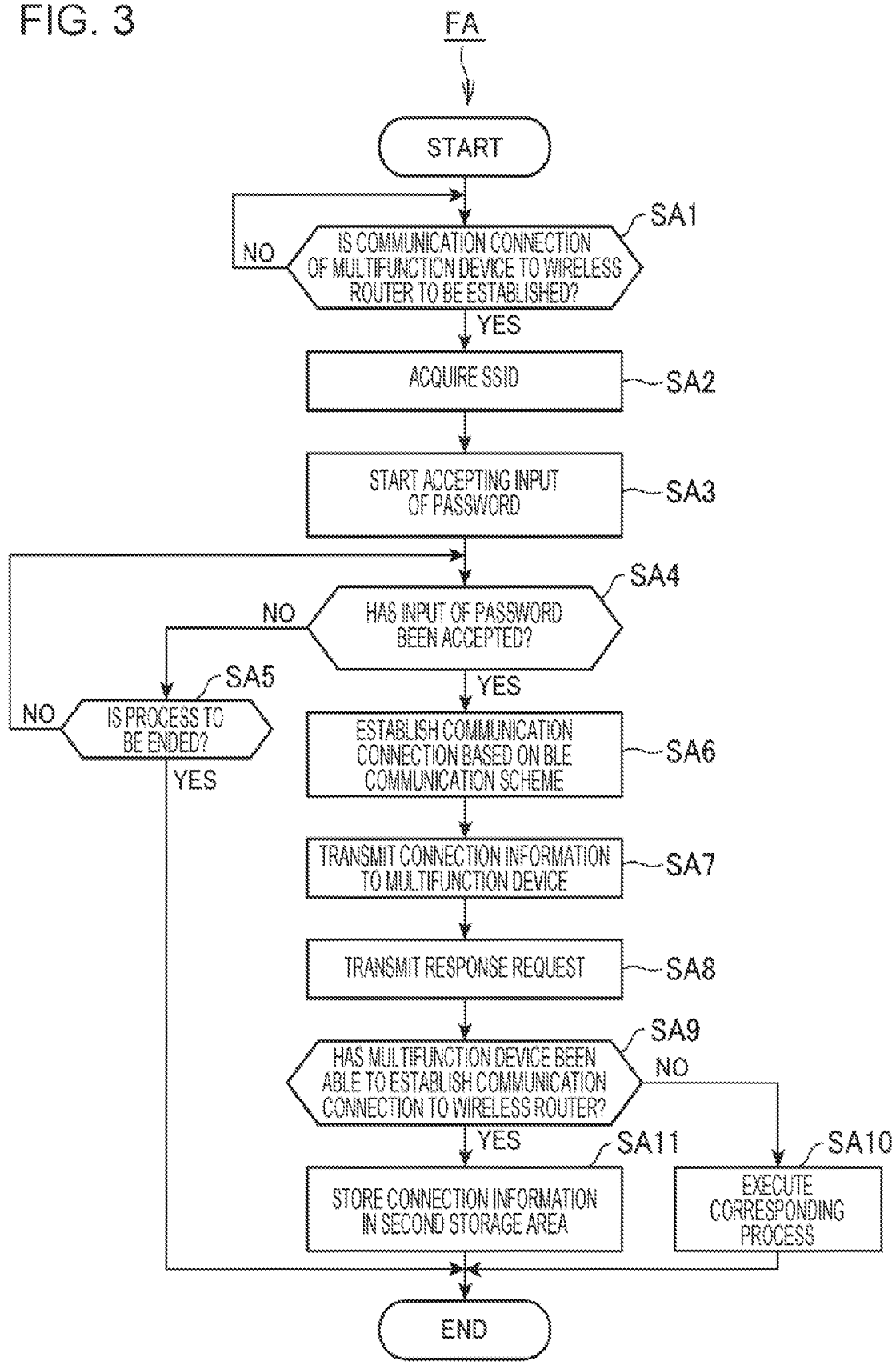
FIG. 3 is a flowchart illustrating operation of the smart device.

FIG. 3 is a flowchart FA illustrating operation of the smart device 2. FIG. 4 is a flowchart FB illustrating the operation of the smart device 2. The operation of the smart device 2 illustrated in FIG. 3 refers to an operation performed when the smart device 2 transmits connection information SJ to the multifunction device 3 for the first time after the smart device 2 establishes a communication connection to the wireless router 1. The operation of the smart device 2 illustrated in FIG. 4 refers to an operation performed when the smart device 2 transmits the connection information SJ to the multifunction device 3 for the second and subsequent times after the smart device 2 establishes a communication connection to the wireless router 1. The multifunction device 3 to which the connection information SJ is transmitted for the second and subsequent times may be the same multifunction device 3 or the other multifunction device 3B. The other multifunction device 3B is a device that can be controlled by using the multifunction device control app 220B in the same way as the multifunction device 3.

The operation of the smart device 2 illustrated in FIG. 3 will be described. Assume that, at the time when the operation of the smart device 2 illustrated in FIG. 3 starts, a communication connection between the wireless router 1 and the smart device 2 has been established by the OS 220A in accordance with the connection information SJ stored in the first storage area MA1. Assume that, at the time when the operation of the smart device 2 illustrated in FIG. 3 starts, the multifunction device control app 220B is activated by a user and the terminal control section 20 functions as the app execution section 2110.

The app execution section 2110 of the smart device 2 determines whether to establish a communication connection of the multifunction device 3 to the wireless router 1 (step SA1).

When an operation detected by the touch panel 22 is an operation of providing an instruction to establish a communication connection of the multifunction device 3 to the wireless router 1, the app execution section 2110 determines in step SA1 that a communication connection of the multifunction device 3 to the wireless router 1 is to be established.

When the app execution section 2110 determines that a communication connection of the multifunction device 3 to the wireless router 1 is to be established (YES in step SA1), the app execution section 2110 acquires a service set identifier (SSID) of the wireless network NW constructed by the wireless router 1 to which the smart device 2 has established a communication connection (step SA2).

The app execution section 2110 starts accepting user's input of a password for connecting to the wireless network NW of the wireless router 1 (step SA3).

In step SA3, the app execution section 2110 causes the touch panel 22 to display a user interface through which a password for connecting to the wireless network NW of the wireless router 1 is input and starts accepting input of the password.

The app execution section 2110 determines, in accordance with a detection result of the touch panel 22, whether the input of the password for connecting to the wireless network NW of the wireless router 1 has been accepted (step SA4).

When the app execution section 2110 determines that the input of the password for connecting to the wireless network NW of the wireless router 1 has not been accepted (NO in step SA4), the app execution section 2110 determines whether to end a process of establishing a communication connection of the multifunction device 3 to the wireless router 1 (step SA5).

When an operation detected by the touch panel 22 is an operation of providing an instruction to end the process of establishing a communication connection of the multifunction device 3 to the wireless router 1, the app execution section 2110 determines in step SA5 that the process of establishing a communication connection of the multifunction device 3 to the wireless router 1 is to be ended. When an operation detected by the touch panel 22 is not an operation of providing an instruction to end the process, the app execution section 2110 determines in step SA5 that the process of establishing a communication connection of the multifunction device 3 to the wireless router 1 is not to be ended.

When the app execution section 2110 determines that the process of establishing a communication connection of the multifunction device 3 to the wireless router 1 is to be ended (YES in step SA5), the app execution section 2110 ends the present processing. When the app execution section 2110 determines that the process of establishing a communication connection of the multifunction device 3 to the wireless router 1 is not to be ended (NO in step SA5), the processing returns to step SA4.

Referring back to step SA4, when the app execution section 2110 determines that the input of the password for connecting to the wireless network NW of the wireless router 1 has been accepted (YES in step SA4), the app execution section 2110 establishes a communication connection based on the BLE communication scheme to the multifunction device 3 by using the second terminal communication section 212 (step SA6). When a communication connection based on the BLE communication scheme between the smart device 2 and the multifunction device 3 has been established before the process of step SA6, the app execution section 2110 may skip the process of step SA6.

Next, the app execution section 2110 transmits, as the connection information SJ of the wireless router 1, a combination of the SSID acquired in step SA2 and the accepted password to the multifunction device 3 by using the second terminal communication section 212 (step SA7).

When the multifunction device control section 30 of the multifunction device 3 receives the connection information SJ of the wireless router 1 by using the second multifunction device communication section 312, the multifunction device control section 30 sets, in the multifunction device setting file 320A, the SSID and the password that are included in the received connection information SJ and establishes a communication connection to the wireless router 1. Setting items related to the multifunction device 3 in the multifunction device setting file 320A include setting items related to wireless communication settings of an SSID and a password. The multifunction device control section 30 sets a setting value indicating the SSID included in the received connection information SJ in a setting item related to an SSID and sets a setting value indicating the password included in the received connection information SJ in a setting item related to a password. Thus, the multifunction device control section 30 establishes a communication connection to the wireless router 1. The multifunction device control section 30 sets the connection information SJ in the multifunction device setting file 320A and then stores the set connection information SJ in the multifunction device storage section 320.

Referring back to the flowchart FA of FIG. 3, the app execution section 2110 transmits the connection information SJ of the wireless router 1 to the multifunction device 3 by using the second terminal communication section 212 and then transmits a response request to the multifunction device 3 by using the first terminal communication section 211 (step SA8). The app execution section 2110 transmits a response request to the multifunction device 3 via the wireless router 1.

Next, the app execution section 2110 determines whether the multifunction device 3 has been able to establish a communication connection to the wireless router 1 (step SA9).

When the app execution section 2110 receives a response to the response request from the multifunction device 3 by using the first terminal communication section 211 within a predetermined period of time from when the app execution section 2110 transmitted the response request in step SA8, the app execution section 2110 determines in step SA9 that the multifunction device 3 has been able to establish a communication connection to the wireless router 1. When the app execution section 2110 receives no response to the response request from the multifunction device 3 by using the first terminal communication section 211 within the predetermined period of time from when the app execution section 2110 transmitted the response request in step SA8, the app execution section 2110 determines in step SA9 that the multifunction device 3 has not been able to establish a communication connection to the wireless router 1.

When the app execution section 2110 determines that the multifunction device 3 has not been able to establish a communication connection to the wireless router 1 (NO in step SA9), the app execution section 2110 executes a corresponding process (step SA10). An example of a corresponding process is a process of providing a notification that the input password is not correct, or the like.

When the app execution section 2110 determines that the multifunction device 3 has been able to establish a communication connection to the wireless router 1 (YES in step SA9), the app execution section 2110 stores, in the second storage area MA2, connection information SJ identical to the connection information SJ transmitted in step SA7 (step SA11). In the second storage area MA2, the connection information SJ with which a connection to the wireless router 1 is possible is stored.

Next, the operation of the smart device 2 illustrated in FIG. 4 will be described. Assume that, at the time when the operation of the smart device 2 illustrated in FIG. 4 starts, the smart device 2 is connected to the wireless network NW constructed by the wireless router 1 by the OS 220A in accordance with the connection information SJ stored in the first storage area MA1. Assume that, at the time when the operation of the smart device 2 illustrated in FIG. 4 starts, the multifunction device control app 220B is activated by the user and the terminal control section 20 functions as the app execution section 2110.

The app execution section 2110 of the smart device 2 determines whether to establish a communication connection of the multifunction device 3 to the wireless router 1 (step SB1).

When the app execution section 2110 determines that a communication connection of the multifunction device 3 to the wireless router 1 is to be established (YES in step SB1), the app execution section 2110 acquires the connection information SJ from the second storage area MA2 (step SB2).

The app execution section 2110 transmits the connection information SJ acquired in step SB2 to the multifunction device 3 by using the second terminal communication section 212 (step SB3).

When the multifunction device control section 30 of the multifunction device 3 receives the connection information SJ of the wireless router 1 by using the second multifunction device communication section 312, the multifunction device control section 30 sets, in the multifunction device setting file 320A, the SSID and the password that are included in the received connection information SJ and establishes a communication connection to the wireless router 1.

In the first storage area MA1, the connection information SJ set in the terminal setting file 220C is stored when the smart device 2 and the wireless router 1 connect to each other. However, the first storage area MA1 is under the control of the OS 220A, and thus the app execution section 2110 is not able to acquire the connection information SJ from the first storage area MA1. For this reason, in the related art, for some types of OSs 220A, the user has to input the password each time the smart device 2 transmits the connection information SJ to the multifunction device 3. Thus, when the app execution section 2110 transmits the connection information SJ to the multifunction device 3 for the second and subsequent times, the app execution section 2110 transmits the connection information SJ stored in the second storage area MA2 to the multifunction device 3. As a result, when the connection information SJ is transmitted to the multifunction device 3 for the second and subsequent times, the user does not have to input the password on each occasion. For example, when a setting of a communication connection to the wireless router 1 is set again for the same multifunction device 3 for which the setting of the connection to the wireless router 1 has been reset to an initial setting, when the other multifunction device 3B that establishes a communication connection to the wireless router 1 is added, or when the multifunction device 3 that establishes a communication connection to the wireless router 1 is replaced with the other multifunction device 3B, the user can easily establish a communication connection of the multifunction device 3 to the wireless router 1, regardless of the OS 220A of the smart device 2 operated by the user.

The connection information SJ to be transmitted for the second and subsequent times is the connection information SJ with which a communication connection to the wireless router 1 was able to be established at the time of the first transmission, and thus the multifunction device 3 can reliably establish a communication connection to the wireless router 1 by using the received connection information SJ. The app execution section 2110 does not have to execute a process related to a determination as to whether the multifunction device 3 has been able to establish a communication connection to the wireless router 1 for the second and subsequent times.

There will be described an operation performed when the multifunction device 3 establishes a communication connection to the wireless router 1 and then the other smart device 2B different from the smart device 2 already having established a communication connection to the wireless router 1 establishes a communication connection to the wireless router 1 in addition to or in place of the smart device 2 already having established the communication connection to the wireless router 1.

FIG. 5 includes flowcharts illustrating operations performed in the wireless communication system 100. In FIG. 5, a flowchart FC illustrates operation of the multifunction device 3, and a flowchart FD illustrates operation of the other smart device 2B that establishes a new communication connection to the wireless router 1.

As illustrated in the flowchart FC, the multifunction device control section 30 of the multifunction device 3 transmits, by using the first multifunction device communication section 311, query information asking whether the connection information SJ has been stored in the second storage area MA2 to the other smart device 2B that establishes a communication connection to the wireless router 1 by using the OS 220A in accordance with the connection information SJ stored in the first storage area MA1 (step SC1).

As illustrated in the flowchart FD, the app execution section 2110 of the other smart device 2B receives the query information from the multifunction device 3 by using the first terminal communication section 211 (step SD1), and then the app execution section 2110 accesses the second storage area MA2 and determines whether the connection information SJ has been stored (step SD2).

When the app execution section 2110 determines that the connection information SJ has been stored in the second storage area MA2 (YES in step SD2), the app execution section 2110 ends the present processing.

When the app execution section 2110 determines that the connection information SJ has not been stored in the second storage area MA2 (NO in step SD2), the app execution section 2110 transmits information indicating that the connection information SJ has not been stored in the second storage area MA2 to the multifunction device 3 by using the first terminal communication section 211 (step SD3).

As illustrated in the flowchart FC, the multifunction device control section 30 receives the information indicating that the connection information SJ has not been stored in the second storage area MA2 (step SC2) and then transmits the connection information SJ stored in the multifunction device storage section 320 to the other smart device 2B (step SC3).

As illustrated in the flowchart FD, when the app execution section 2110 receives the connection information SJ from the multifunction device 3 (step SD4), the app execution section 2110 stores the received connection information SJ in the second storage area MA2 (step SD5).

After the multifunction device 3 establishes a communication connection to the wireless router 1, when the other smart device 2B different from the smart device 2 already having established a communication connection to the wireless router 1 establishes a communication connection to the wireless router 1 in addition to or in place of the smart device 2 already having established the communication connection to the wireless router 1, the connection information SJ is automatically stored in the second storage area MA2 of the other smart device 2B that establishes a new communication connection. For this reason, when a setting of a communication connection to the wireless router 1 is set for the multifunction device 3 by the other smart device 2B that has established the new communication connection, the user does not have to input the password. When the other smart device 2B establishes a new communication connection to the wireless router 1 and establishes a communication connection of the multifunction device 3 to the wireless router 1, the user can easily establish a communication connection of the multifunction device 3 to the wireless router 1, regardless of the OS 220A of the smart device 2B operated by the user.

The smart device 2 connects to the wireless router 1 and wirelessly communicates with the wireless router 1. The smart device 2 includes the terminal control section 20 configured to execute the OS 220A, and the multifunction device control app 220B that operates on the OS 220A; the terminal storage section 220 having the first storage area MA1 that is controlled by the OS 220A and stores the connection information SJ of the wireless router 1, and the second storage area MA2 that is accessible by the multifunction device control app 220B; and the terminal communication section 21 including the first terminal communication section 211 configured to communicate with the wireless router 1 by using the wireless LAN communication scheme, and the second terminal communication section 212 configured to communicate with the multifunction device 3 by using the BLE communication scheme. Through operation of the multifunction device control app 220B, the terminal control section 20 stores the connection information SJ in the second storage area MA2 and transmits the connection information SJ stored in the second storage area MA2 to the multifunction device 3 by using the second terminal communication section 212.

In a communication setting method performed by the smart device 2, the connection information SJ of the wireless router 1 is stored in the second storage area MA2 being different from the first storage area MA1 that is controlled by the OS 220A and stores the connection information SJ and being accessible by the multifunction device control app 220B that operates on the OS 220A, and the connection information SJ stored in the second storage area MA2 is transmitted to the multifunction device 3 through operation of the multifunction device control app 220B.

A non-transitory computer-readable storage medium stores the multifunction device control app 220B causing the terminal control section 20 to execute a process. The process includes storing the connection information SJ of the wireless router 1 in the second storage area MA2 different from the first storage area MA1 that is controlled by the OS 220A and stores the connection information SJ; and transmitting the connection information SJ stored in the second storage area MA2 to the multifunction device 3.

In the configurations of the smart device 2, the communication setting method performed by the smart device 2, and the multifunction device control app 220B, the connection information SJ stored in the second storage area MA2 is transmitted, and thus the connection information SJ can easily be transmitted to the multifunction device 3, regardless of the OS 220A of the smart device 2. Since the connection information SJ can easily be transmitted to the multifunction device 3, for example, when a setting of a communication connection to the wireless router 1 is set again for the same multifunction device 3, when a multifunction device 3 that establishes a communication connection to the wireless router 1 is added, or when the multifunction device 3 that establishes a communication connection to the wireless router 1 is replaced, the smart device 2 can easily establish a communication connection of the multifunction device 3 to the wireless router 1, regardless of the OS 220A.

The connection information SJ includes an SSID and a password for the wireless router 1.

In this configuration, the smart device 2 can easily establish a communication connection of the multifunction device 3 to the wireless router 1 with which communication is possible in accordance with the wireless LAN standards, regardless of the OS 220A.

The terminal control section 20 accepts input of the password and stores the connection information SJ including the accepted password in the second storage area MA2 through operation of the multifunction device control app 220B.

In this configuration, when a communication connection of the multifunction device 3 to the wireless router 1 is established, the user does not have to input the password on each occasion. For example, when a setting of a communication connection to the wireless router 1 is set again for the same multifunction device 3, when a multifunction device 3 that establishes a communication connection to the wireless router 1 is added, or when the multifunction device 3 that establishes a communication connection to the wireless router 1 is replaced, the user can easily establish a communication connection of the multifunction device 3 to the wireless router 1, regardless of the OS 220A of the smart device 2.

When the multifunction device 3 is able to establish a communication connection to the wireless router 1 in accordance with the transmitted connection information SJ, the terminal control section 20 stores the connection information SJ in the second storage area MA2 through operation of the multifunction device control app 220B.

In this configuration, the connection information SJ to be transmitted is the connection information SJ with which a communication connection to the wireless router 1 was able to be established, and thus the smart device 2 can reliably establish a communication connection of the multifunction device 3 to the wireless router 1.

The terminal control section 20 transmits the connection information SJ to the multifunction device 3 through operation of the multifunction device control app 220B.

In this configuration, the connection information SJ is transmitted to the multifunction device 3 through operation of the multifunction device control app 220B, and thus the smart device 2 can easily establish a communication connection of the multifunction device 3 to the wireless router 1 through operation of the multifunction device control app 220B.

The multifunction device 3 has a reading function. The multifunction device control app 220B has a function of causing the multifunction device 3 to perform reading.

In this configuration, the smart device 2 can easily establish a communication connection of the multifunction device 3 to the wireless router 1 through operation of the multifunction device control app 220B that can cause the multifunction device 3 to perform reading.

The embodiment described above is for the purpose of describing one aspect of the present disclosure only, and any modification and application can be made within the scope of the present disclosure.

The terminal device may be of a desktop type or laptop type.

Although the BLE communication scheme has been given as an example of the second wireless communication scheme, the second wireless communication scheme is not limited to the BLE communication scheme and may be a communication scheme complying with Bluetooth standards other than the BLE standards, or a communication scheme complying with short-range wireless communication standards other than the Bluetooth standards. Although the Wi-Fi communication scheme has been given as an example of the first wireless communication scheme, the first wireless communication scheme may be another wireless communication scheme. Note that it is desirable that the first wireless communication scheme is a wireless communication scheme in which a communication rate and a range in which communication is possible are higher and wider than those in the second wireless communication scheme.

Although the multifunction device 3 including a serial print head has been given as an example, the multifunction device 3 may include a line print head. A printing method employed by the multifunction device 3 is not limited to an ink jet method and may be another printing method.

Although the multifunction device 3 has been given as an example of a printing device, the printing device may be a printer having no reading function. A subject caused to establish a communication connection to the wireless router 1 by the smart device 2 may be an information processing device, such as a scanner or projector, other than the multifunction device 3.

Functions of the terminal control section 20 and the multifunction device control section 30 may be implemented by a plurality of processors or a semiconductor chip.

Each component illustrated in FIG. 2 is an example, and a specific implementation form is not limited to a particular form. Hardware individually corresponding to each component does not necessarily have to be implemented, and a configuration is certainly possible where a function of each component is implemented by one processor executing a program. Part of a function implemented by software may be implemented by hardware, or part of a function implemented by hardware may be implemented by software. Additionally, with respect to specific detailed configurations of other components of the smart device 2 and the multifunction device 3, any changes can be made without departing from the gist of the present disclosure.

Steps of the operation illustrated in each of FIGS. 3, 4, and 5 are steps into which the operation is divided in accordance with main processing details to facilitate understanding of the operation of each device in the wireless communication system 100. The steps are not restricted by the way of division into units of processing and the names of the units of processing. In accordance with processing details, the operation may be divided into even more steps. One step may be divided so as to include even more processes. The order of the steps may be changed as appropriate to an extent that does not hinder the gist of the present disclosure.

What is claimed is:

1. A terminal device configured to connect to a wireless router by using a first wireless communication scheme and wirelessly communicate with a printing device configured to connect to the wireless router, the terminal device comprising:
   a controller configured to execute an operating system, and an application program that is related to the printing device and operates on the operating system;
   a storage having a first storage area that is controlled by the operating system and stores first connection information of the wireless router, and a second storage area that is accessed by the application program, the first storage area not being accessible by the application program; and
   a communicator including a first communicator configured to communicate with the wireless router by using the first wireless communication scheme, and a second communicator configured to communicate with the printing device by using a second wireless communication scheme, wherein,
   the second communicator, when a second connection information is received through an input device of the terminal device,
       transmits the second connection information to the printing device by using the second communicator, wherein the printing device attempts to connect the wireless router by using the second connection information, and the first communicator transmits a request response to the printing device by using the first communicator via the wireless router, and
       when the first communicator receives a response to the request response from the printing device, the controller stores the second connection information in the second storage area, wherein
   the controller transmits the second connection information stored in the second storage area to the printing device or another printing device by using the second communicator so that when the application program initiates a second or subsequent transmission of the second connection information stored in the second storage area to the printing device, no connection information is received through the input device of the terminal device.

2. The terminal device according to claim 1, wherein the controller accepts input of a password and stores the second connection information including the accepted password in the second storage area.

3. The terminal device according to claim 2, wherein the controller
   stores, when the printing device establishes a communication connection to the wireless router in accordance with the connection information transmitted after acceptance of the input of the password, the connection information including the accepted password in the second storage area.

4. The terminal device according to claim 1, wherein the controller
   transmits the connection information to the printing device.

5. The terminal device according to claim 1, wherein the printing device has a reading function, and the application program has a function of causing the printing device to perform reading.

6. A communication setting method performed by a terminal device configured to connect to a wireless router by using a first wireless communication scheme and wirelessly communicate with a printing device configured to connect to the wireless router, the communication setting method comprising:
   connecting to the wireless router by using first connection information of the wireless router stored in a first storage area that is controlled by an operating system and stores the connection information, the first storage area being different from a second storage area that is accessed by an application program that is related to the printing device and operates on the operating system, the first storage area not being accessible by the application program;
   receiving second connection through an input device and transmitting the second connection information to the printing device by using a second wireless communication scheme different from the first wireless communication scheme, wherein the printing device attempts to connect the wireless router by using the second connection information, and transmitting a request response to the printing device by using the first wireless communication scheme via the wireless router, and when a response to the request response from the printing device is received, storing the second connection information in the second storage area, and
   transmitting, through operation of the application program, the second connection information stored in the second storage area to the printing device or another printing device by using the second wireless communication scheme different from the first wireless communication scheme so that when the application program initiates a second or subsequent transmission of the second connection information stored in the second storage area to the printing device, no connection information is received through an input device of the terminal device.

7. The communication setting method performed by the terminal device according to claim 6, wherein input of a password is accepted, and the connection information including the accepted password is stored in the second storage area.

8. The communication setting method performed by the terminal device according to claim 7, wherein,
   when the printing device establishes a communication connection to the wireless router in accordance with the connection information transmitted after acceptance of the input of the password, the connection information including the accepted password is stored in the second storage area.

9. The communication setting method performed by the terminal device according to claim 6, wherein
   the connection information is transmitted to the printing device.

10. The communication setting method performed by the terminal device according to claim 6, wherein
    the printing device has a reading function, and
    the application program has a function of causing the printing device to perform reading.

11. A non-transitory computer-readable storage medium storing a program that is related to a printing device and is executed by a controller of a terminal device configured to wirelessly communicate with a wireless router by using a first wireless communication scheme and wirelessly communicate with the printing device configured to connect to the wireless router, the program causing the controller to execute a process comprising:
    connecting to the wireless router by using first connection information of the wireless router stored in a first storage area that is controlled by an operating system and stores the connection information, the first storage area being different from a second storage area that is accessed by an application program that is related to the printing device and operates on the operating system, the first storage area not being accessible by the application program;
    receiving second connection through an input device and transmitting the second connection information to the printing device by using a second wireless communication scheme different from the first wireless communication scheme, wherein the printing device attempts to connect the wireless router by using the second connection information, and transmitting a request response to the printing device by using the first wireless communication scheme via the wireless router, and when a response to the request response from the printing device is received, storing the second connection information in the second storage area; and
    transmitting the second connection information stored in the second storage area to the printing device or another printing device by using the second wireless communication scheme different from the first wireless communication scheme, the connection information is stored in the second storage area so that when the program initiates a second or subsequent transmission of the second connection information stored in the second storage area to the printing device, no connection information is received through an input device of the terminal device.

12. The non-transitory computer-readable storage medium according to claim 11, wherein,
    in the process, input of a password is accepted, and the connection information including the accepted password is stored in the second storage area.

13. The non-transitory computer-readable storage medium according to claim 12, wherein,
    in the process, when the printing device establishes a communication connection to the wireless router in accordance with the connection information transmitted after acceptance of the input of the password, the connection information including the accepted password is stored in the second storage area.

14. The non-transitory computer-readable storage medium according to claim 11, wherein,
    in the process, the connection information is transmitted to the printing device.

15. The non-transitory computer-readable storage medium according to claim 11, wherein
    the printing device has a reading function, and
    the program has a function of causing the printing device to perform reading.

* * * * *